Oct. 1, 1929.                H. BANY                1,729,699
                    SYSTEM OF ELECTRIC DISTRIBUTION
                         Filed Jan. 31, 1928

Inventor:
Herman Bany,
by Charles E. Tullar
His Attorney.

Patented Oct. 1, 1929

1,729,699

UNITED STATES PATENT OFFICE

HERMAN BANY, OF YEADON, PENNSYLVANIA, ASSIGNOR TO GENERAL ELECTRIC COMPANY, A CORPORATION OF NEW YORK

SYSTEM OF ELECTRIC DISTRIBUTION

Application filed January 31, 1928. Serial No. 250,923.

My invention relates to systems of electric distribution and particularly to a system in which an exciter is used as a source of control current as well as a source of excitation for a dynamo-electric machine and its object is to provide an arrangement whereby the voltage of the exciter is automatically increased to a predetermined value, which is sufficient to operate the control devices energized therefrom, when any switching is done which requires the control devices to be energized from the exciter.

My invention is especially adapted for use in automatic control systems for alternating current generators in which the generators are started from rest and connected to a load circuit automatically. In such control systems it is customary to use the exciter as a source of control current for the closing coil of the switch which connects the generator to the line and for the closing coil of the field switch which connects the generator field winding to the exciter. It is very important therefore that the exciter voltage should be sufficient to close these switches whenever it is desired to close them. When the excitation of the exciter is controlled by a voltage regulator, the regulator may cause the exciter voltage to be maintained at such a low value at the time the switching operation is to be effected that the switches will not close satisfactorily. In accordance with the preferred embodiment of my invention I insert current limiting means in series with the exciter whenever any switching is to be done so that the regulator causes the exciter voltage to be built up to value above normal in order for it to maintain the desired generator voltage. In this manner the exciter voltage is increased to a sufficient value to insure proper operation of the switching means.

My invention will be better understood from the following description, taken in connection with the accompanying drawing and its scope will be pointed out in the appended claims.

Figure 1:
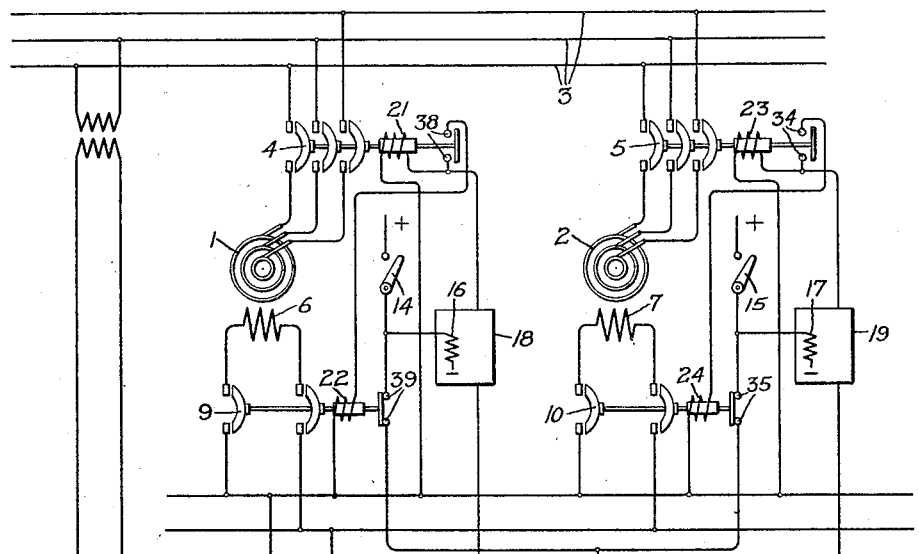
Figure 3:
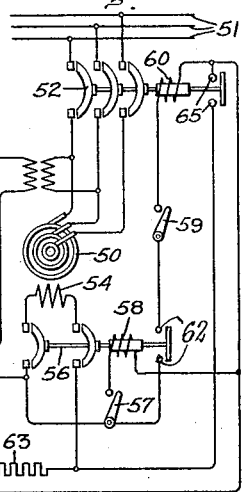
Figure 2:
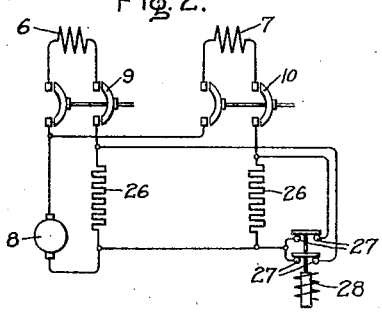

In the accompanying drawing Fig. 1 shows diagrammatically a portion of a control system for two generators embodying my invention and Fig. 2 shows a modification of a portion of the system shown in Fig. 1, and Fig. 3 shows diagrammatically a portion of a control system for a single generator embodying my invention.

Referring to Fig. 1, 1 and 2 represent two alternating current generators which are arranged to be connected to a common load circuit 3 by suitable switches 4 and 5 respectively. The generators 1 and 2 are provided with field windings 6 and 7 respectively which are arranged to be connected to a common exciter 8 by means of suitable field switches 9 and 10. The excitation of the exciter 8 is arranged to be controlled by a suitable automatic voltage regulator 11, examples of which are well-known in the art, so that the excitation of the generators connected to the load circuit 3 is automatically varied to maintain the load circuit voltage at a predetermined value. As shown the regulator 11 is a voltage regulator of a well-known Tirrill type controlling a short circuit around the resistor 12 in the circuit of the exciter shunt field winding 13 in response to the voltage of the load circuit 3.

The starting of each generator and the closing of its field switch and the switch connecting the generator to the load circuit may be effected in any suitable manner, either manually or automatically, examples of which are well-known in the art. The details of suitable automatic switching means for effecting the various operations are immaterial so far as my present invention is concerned and, therefore, I have deemed it advisable to show only enough of such automatic control equipments to permit one readily to understand the operation and utility of my invention. In such automatic switching equipments the starting of a generator is usually effected by the operation of a suitable control device, such as the closing of a switch, which effects the energization of a master control relay. The energization of the control relay then effects the starting of the generator from rest and its synchronization with the line to which it is to supply current. Various arrangements well-known in the art may be employed for bringing the generator into synchronism with the line.

As shown in Fig. 1, the generators 1 and 2 are provided with suitable control devices 14 and 15, shown as hand switches, which when closed effect the energization of master control relays 16 and 17 respectively of suitable automatic switching means 18 and 19. The automatic switching means 18 is arranged in any suitable manner, examples of which are well-known in the art, to start the generator 1 from rest and to connect the closing coil 21 of the switch 4 across the exciter terminals when the generator 1 reaches a certain speed condition during its starting operation. As soon as switch 4 closes to connect generator 1 across line 3, closing coil 22 of field switch 9 is connected across the exciter terminals to close switch 9 so as to excite the field winding 6 and pull the generator into synchronism with the line.

The automatic switching means 19 is arranged in a similar manner to start the generator 2 when the master relay 17 is energized to connect the closing coil 23 of the switch 5 across the exciter terminals when the generator reaches a certain speed condition and to connect the winding 24 of the field switch 10 across the exciter terminals after the switch 5 is closed so as to pull the generator 2 into synchronism with the line.

In the arrangement shown the coils 21, 22, 23 and 24 are energized from the exciter. Therefore it is very important that the voltage of the exciter should be high enough to energize these coils sufficiently to close their respective switches. Under certain load conditions of the system, however, the voltage regulator may maintain the exciter voltage at a relatively low voltage. Therefore it is very desirable to provide an arrangement for insuring that the exciter voltage is high enough to operate the switches properly during the starting operation of the generators.

In accordance with the arrangement shown in this figure I accomplish this result by inserting a current limiting means or impedance, in series between the exciter and the field winding of each machine while a machine is being started so that the regulator 11 has to maintain a higher exciter voltage in order to excite the generator field windings sufficiently to maintain the desired load circuit voltage.

As shown in Fig. 1 the impedance comprises a common resistor 26 in series with the exciter and both generator field windings. Normally the resistor 26 is short circuited by contacts 27 of a relay 28. When either the control switch 14 or 15 is closed a circuit is completed for a control relay 29, if the exciter voltage is less than a certain amount so that the contacts 30 of an exciter voltage responsive relay 31 are closed. The control relay 29 in turn effects the energization of the control relay 28 to open its contacts 27 in the short circuit around the resistor 26. As long as either control switch is closed and its associated field switch is open the relay 29 is energized. When, however, the starting operation of the generator has been completed and the associated field switch is closed the control relay 29 is deenergized so that the short circuit around the resistor 26 is again closed.

While I have shown a common resistor 26 in Fig. 1 in some cases it may be desirable to use a separate resistor 26 for each generator field winding as shown in Fig. 2 in which case the relay is provided with a separate set of contacts 27 for each resistor.

The operation of the arrangement shown in Fig. 1 is as follows: Assume that the generator 1 is in service and that it is desired to place the generator 2 in service. Under these conditions the switches 4 and 9 are closed so that the generator 1 is connected to the load circuit 3 and the exciter 8 is supplying current to field winding 6. The voltage regulator 11 controls the excitation of the exciter 8 in a manner well-known in the art so that the voltage of generator 1 is maintained at a predetermined value. The resistor 26 is short circuited by the contacts 27 of relay 28 which is deenergized.

The starting of the generator 2 is effected by the closing of the control switch 15 associated therewith. The closing of this switch completes a circuit for the master relay 17 of the automatic switching means 19 so that generator 2 is started and after it has reached approximately synchronous speed a circuit is completed for the closing coil 23 of switch 5 across the terminals of exciter 8 to connect the generator 2 to the load circuit 3 with the field winding 7 unexcited. The closing of auxiliary contacts 34 on the switch 5 completes a circuit for the closing coil 24 of switch 10 across the terminals of the exciter 8 so that the field winding 7 is energized to pull the generator 2 into synchronism with the other sources connected to the load circuit 3.

In order that the exciter voltage may be sufficient to operate the switches 5 and 10, the closing of the control switch 15 also completes a circuit for the relay 29 if the exciter voltage is below a predetermined value so that contacts 30 of exciter voltage relay 31 are closed. This circuit is from one side of a suitable source of control current, through switch 15, auxiliary contacts 35 on field switch 10, contacts 30 of relay 31, coil of relay 29 to the other side of the control source. Relay 29 by closing its contacts 36 completes a locking circuit for itself which is independent of the contacts 30 so that the relay 29 is not deenergized by the exciter voltage subsequently increasing to a value sufficient to cause relay 31 to open its contacts 30. Relay 29 by closing its contacts 37 completes a circuit for the control relay 28 which in turn opens its contacts 27 so that the normally closed short circuit around the resistor 26 is opened. The insertion of the resistor in series with the exciter reduces the voltage of the generator 1 so that the regulator 11 immediately causes the exciter voltage to be increased to a value above normal in order that sufficinet current will flow through the resistor 26 to the field winding 6 to maintain the load circuit voltage at the desired value. Since the starting of the generator from rest to substantially synchronous speed takes an appreciable time whereas the operation of the regulator 11 is substantially instantaneous it will be observed that the exciter voltage will be increased to its increased value prior to the time the closing coil 23 is energized to connect the generator 2 to the load circuit.

After the starting operation of the generator has been completed the short circuit around the resistor 26 is again completed so that the exciter voltage is restored to normal by the regulator. In Fig. 1 this result is accomplished by the opening of the auxiliary contacts 35 on the field switch 10. The opening of these contacts 35 opens the heretofore described circuit of the relay 29 which in turn deenergizes the control relay 28 so that the contacts 27 thereof are closed.

It will be apparent that the operation is similar when the generator 1 is started while the generator 2 is in service. The closing of its control switch 14 effects the operation of the associated automatic switching means 18 to start generator 1 from rest, to close switch 4 when the generator reaches a predetermined speed and to complete the circuit of the closing coil 22 through auxiliary contacts 38 on the switch 4 so that the generator 1 is excited after it is connected to the load circuit 3. The closing of the control switch 14 also completes through auxiliary contacts 39 on the field switch 9 a circuit for the relay 29 if the contacts 30 of exciter voltage relay 31 are closed so that during the starting operation of the generator 1 and until the field switch 9 is closed the resistor 26 is connected in series with the exciter in order to cause the regulator 11 to increase the exciter voltage above normal, that is above the value of exciter voltage which is normally held by the regulator to give normal generator voltage.

In Fig. 3 I have shown my invention in connection with a control system for a generator in which the generator is excited by the exciter before being connected to the load circuit. This modification is especially applicable to a system in which the connection to the load circuit is effected by an automatic synchronizer, examples of which are well-known in the art. However, in order to simplify the disclosure I have shown the invention in connection with a manually controlled system.

In Fig. 3 a synchronous generator 50 is arranged to be connected to a load circuit 51 by means of a suitable circuit breaker 52 examples of which are well-known in the art. The generator 50 is provided with a field winding 54 which is arranged to be connected to an exciter 55 by a suitable field switch 56. As shown in the drawing the field switch 56 is arranged to be closed by the closing of a hand switch 57 which connects the closing coil 58 of the field switch across the exciter and the circuit breaker 52 is arranged to be closed by the closing of a hand switch 59 which connects the closing coil 60 of the circuit breaker 52 across the exciter when the auxiliary contacts 62 on the field switch 56 are closed. Any other suitable control means, examples of which are well-known in the art, may be used to control the operation of these switches. The excitation of the exciter 55 is controlled by a suitable voltage regulator 61 so as to maintain the generator voltage at a predetermined value. 63 is a resistor which is arranged to be connected in series between the exciter 55 and the generator field winding 54 whenever the circuit breaker 52 is open.

The operation of the arrangement of Fig. 3 is as follows: When it is desired to place the generator 50 in service the prime mover (not shown) for the generator is started in any suitable manner so as to bring the generator up to substantially synchronous speed. The exciter 55 is also started. The exciter may be direct connected to the generator and its prime mover or may be separately driven, by any suitable means. As soon as the exciter voltage builds up to a predetermined value the switch 57 is closed to connect the closing coil 58 of field switch 56 across the exciter terminals. After the field switch 56 closes and the generator voltage builds up the regulator 61 controls the excitation of the exciter at such a value that the exciter supplies sufficient current through the resistor 63 to the generator field winding 54 to maintain the generator voltage at a predetermined value. Then at the proper time switch 59 is closed and connects the closing coil 60 across the exciter 55 so that the switch 52 closes and connects the generator 50 to the load circuit 51. The closing of the auxiliary contacts 65 on circuit breaker 52 completes a short circuit around the resistor 63 so that the regulator 61 operates in a manner well-known in the art to restore the exciter voltage to its normal value.

It will be observed in this modification that until the starting operation of the generator is completed by the closing of the circuit breaker 52 the regulator 61 maintains the exciter voltage above normal so that sufficient voltage is impressed upon the closing coil 60 to close the circuit breaker 52.

While I have in accordance with the patent statutes shown and described my invention as applied to particular systems and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States, is:—

1. In combination a dynamo-electric machine having a field winding, an exciter for said field winding, regulating means responsive to an electrical condition controlled by the exciter voltage for automatically controlling the excitation of the exciter so as to regulate said electrical condition in a predetermined manner, switching means for effecting the starting of said dynamo-electric machine, and means controlled by said switching means for causing said regulating means to maintain an exciter voltage above normal in order to regulate said predetermined electrical condition in said manner during the starting operation of said machine.

2. In combination, a synchronous generator, a load circuit, an exciter for said generator, automatic regulating means responsive to an electrical condition controlled by the voltage of said exciter for automatically regulating the exciter excitation so as to maintain said electrical condition at a predetermined value, switching means for starting said generator and connecting it to said circuit comprising electroresponsive means energized from said exciter, means controlled by said switching means for causing said regulation means to maintain the voltage of said exciter above normal in order to maintain said electrical condition at said predetermined value during the starting operation and at its normal value in order to maintain said predetermined electrical condition at said predetermined value after said generator has been started and connected to said circuit.

3. In combination, an electric circuit, a synchronous dynamo-electric machine, an exciter for the field winding of said machine, a circuit supplied by said exciter regulating means responsive to a predermined electrical condition which depends upon the current in said exciter circuit for controlling the voltage of said exciter, switching means for effecting the starting of said machine, current limiting means, means for connecting said current limiting means in series between said exciter and said exciter circuit to cause said regulating means to increase the excitation of said exciter, and means responsive to the completion of the starting operation of said machine for decreasing the effectiveness of said current limiting means.

4. In combination, a load circuit, a generator, switching means for connecting said generator to said circuit, an exciter for said generator, regulating means responsive to an electrical condition controlled by the voltage of said exciter for regulating the excitation of said exciter so as to regulate said electrical condition in a predetermined manner, electroresponsive means for controlling the closing of said switching means, means for connecting said electroresponsive means across said exciter, and means for causing said regulator to maintain a higher exciter voltage than normal in order to regulate said electrical condition in said predetermined manner, while said generator is in operation and is disconnected from said load circuit and to maintain normal exciter voltage in order to effect said regulation after said generator is connected to said circuit.

5. In combination, a load circuit, a generator, switching means for connecting said generator to said circuit, an exciter for said generator, an electric circuit supplied by said exciter regulating means responsive to a predetermined electrical condition which depends upon the current in said electric circuit for controlling the excitation of said exciter, electroresponsive means for controlling the closing of said switching means, means for connecting said electroresponsive means across said exciter, current limiting means, means for connecting said current limiting means in series with said exciter and said electric circuit to cause said regulating means to increase the excitation of said exciter, and means controlled by said switching means for short circuiting said current limiting means after said generator is connected to said circuit.

6. In combination, a plurality of dynamo-electric machines having field windings, means for starting each machine, a common exciter for said field windings, and means controlled by said starting means for increasing the exciter voltage during the starting operation of each machine.

7. In combination, a plurality of generators having field windings, a common exciter for said field windings, an electric circuit, switching means associated with each generator for connecting it to said circuit, electroresponsive closing means for each switching means, a control device for effecting the connection of each electroresponsive closing means across said exciter, and means controlled by each control device for effecting an increase in the exciter voltage before the associated electroresponsive means is connected thereto.

8. In combination, an alternating current circuit, a plurality of synchronous generators, switching means for connecting each generator to said circuit, a closing coil for each switching means, a common exciter for said generators, automatic regulating means for controlling the excitation of said exciter, current limiting means, and means associated with each generator arranged to effect in sequence the connection of said current limiting means in series with said exciter and the connection of the associated closing coil directly across the exciter terminals.

9. In combination, a plurality of generators, a common exciter for said generators, a load circuit, automatic switching means for effecting the starting of each generator and the connection thereof to said load circuit comprising electroresponsive means energized from said exciter, a control device for effecting the operation of each switching means, and means controlled by each control device for effecting an increase in the voltage of said exciter during the starting operation of the associated generator and until it is connected to the load circuit.

10. In combination, a load circuit, a generator connected to said circuit, a disconnected generator, a common exciter for said generator field windings, switching means for effecting the starting of said disconnected generator and its connection to said load circuit comprising electroresponsive means energized from said exciter, a control device for controlling the operation of said switching means, means responsive to the voltage of said circuit for controlling the excitation of said exciter, an impedance, and means controlled by said control device for inserting said impedance in series with said exciter and the field winding of the connected generator during the starting operation of the disconnected generator.

11. In combination, a load circuit, a generator connected to said circuit, a disconnected generator, a common exciter for said generator field windings, means for effecting the starting of said disconnected generator and its connection to said load circuit comprising electroresponsive means energized from said exciter, a control device for controlling the operation of said switching means, means responsive to the voltage of said circuit for controlling the excitation of said exciter, a normally short circuited resistor in series with said exciter and the connected generator, an electroresponsive device arranged when energized to effect the opening of the short circuit around said resistor, a control circuit for said electroresponsive device, means controlled by said control device for completing said control circuit, and means controlled by the connection of said disconnected source to said load circuit for interrupting said control circuit.

12. In combination, a plurality of dynamo-electric machines having field windings, means for starting each machine, a common exciter for said field windings, and means controlled by said starting means for increasing the exciter voltage during the starting operation of each machine, and means responsive to the voltage of said exciter for preventing said control means from increasing the exciter voltage under predetermined voltage conditions of said exciter.

13. In combination, a load circuit, a generator connected to said circuit, a disconnected generator, a common exciter for said generator field windings, switching means for effecting the starting of said disconnected generator and its connection to said load circuit comprising electroresponsive means energized from said exciter, a control device for controlling the operation of said switching means, means responsive to the voltage of said circuit for controlling the excitation of said exciter, a normally short circuited resistor in series with said exciter, an electroresponsive device arranged when energized to effect the opening of the short circuit around said resistor, a control circuit for said electroresponsive device, means controlled by said control device for completing said control circuit, and means responsive to the voltage of said exciter for preventing the completion of said control circuit when the exciter voltage is above a predetermined value.

14. In combination, an electric circuit, a dynamo-electric machine having a field winding, a switch for connecting said machine, to said circuit, an exciter for said machine, regulating means for controlling the excitation of said machine, a switch for connecting said exciter to the field winding of said machine, electroresponsive means energized by said exciter for controlling the operation of said switches, a control device for controlling the operation of said electroresponsive means, a resistor, an electroresponsive device arranged when energized to effect the connection of said resistor in series with said exciter and field winding, a circuit for said electro-responsive device, means for completing said last mentioned circuit, and means controlled by said switches for opening said last mentioned circuit.

15. In combination, a load circuit, a plurality of generators each having a field winding, a common exciter, switching means for connecting each generator to said load circuit, field switching means for connecting said exciter to the field winding of each generator, electroresponsive means energized by said exciter for controlling the operation of said switching means, a control device associated with each generator for controlling the operation of the associated switching means, regulating means responsive to the voltage of said load circuit for controlling the excitation of said exciter, a normally short circuited impedance in series with said exciter, means controlled by each control device and its associated field switching means for opening the short circuit around said impedance while the control device is in a predetermined position and the associated field switching means is open.

In witness whereof, I have hereunto set my hand this 28th day of January, 1928.

HERMAN BANY.